(12) United States Patent
Minai

(10) Patent No.: US 7,213,863 B2
(45) Date of Patent: May 8, 2007

(54) STRUCTURE OF VEHICLE SEAT WITH LIFTER

(75) Inventor: Masamitsu Minai, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 409 days.

(21) Appl. No.: 10/765,211

(22) Filed: Jan. 28, 2004

(65) Prior Publication Data
US 2005/0161991 A1    Jul. 28, 2005

(51) Int. Cl.
*B60N 2/10* (2006.01)
(52) U.S. Cl. .............. 296/68.1; 296/65.13; 297/344.12; 297/344.15
(58) Field of Classification Search .............. 296/68.1, 296/63, 65.01, 65.13; 297/344.12, 344.14, 297/344.15
See application file for complete search history.

(56) References Cited

U.S. PATENT DOCUMENTS 5,697,674 A * 12/1997 Aufrere et al. ........ 297/344.15
6,902,237 B2 * 6/2005 Petry ..................... 297/344.15

FOREIGN PATENT DOCUMENTS

| JP | 2001-088589 | 4/2001 |
|----|-------------|--------|
| JP | 2002-046513 | 2/2002 |

* cited by examiner

*Primary Examiner*—Joseph D. Pape
(74) *Attorney, Agent, or Firm*—Browdy and Neimark, PLLC

(57) ABSTRACT

A structure of seat with seat lifter having two lifter links pivotally connected between a seat cushion and an upwardly extending support element fixed on vehicle floor, which includes a horizontal bar element extended between the two lifter links to prevent forward slippage of a passenger on the seat cushion. A reinforcing element is provided between the two lifter links and an upwardly extending support element so as to reinforce the two links, while allowing for movement of the two lifter links with respect to the upwardly extending support element, via a connecting element. The reinforcing element may comprise two reinforcing brackets connected with the respective two lifter links and the upwardly extending support element via the connecting element, or may comprise a lower extension area formed in each of the lifter links, which is movably connected with the upwardly extending support element via the connecting element.

15 Claims, 4 Drawing Sheets

STRUCTURE OF VEHICLE SEAT WITH LIFTER

BACKGROUND OF THE INVENTION

1. Field of the Invention

The present invention relates to a structure of vehicle seat with a lifter for causing vertical displacement of the seat, in which a linkage of the lifter is provided to at least a forward portion of a seat back of the seat. In particular, the invention is directed to a vehicle seat structure of this kind wherein a forward slippage preventive element is provided to the lifter linkage so as to prevent a passenger from slipping and being slid forwardly on the seat when a collision or the like occurs.

2. Description of Prior Art

In the case of an abrupt deceleration or stop of a vehicle, a passenger on a seat in the vehicle is naturally caused to displace forwardly under the influence of inertia. Such forward displacement of passenger is basically prevented by a seat belt which restrains the passenger to the seat. However, in such an emergency case as a collision, the stop of the vehicle is so abrupt that, in spite of the restraint by seat belt, the buttocks portion of the passenger is forcibly slipped or slid forwardly on a seat cushion of the seat and sunk into the upper elastic portion of the seat cushion, with a high likelihood that the lower body portion of the passenger will be damaged or injured. This is what is called "forward buttocks slippage phenomenon".

Hitherto, various attempts have been made to prevent such forward buttocks slippage phenomenon. For example, the Japanese Laid-Open Patent Publication No. 2002-46513 discloses a cross rod member provided in the seat cushion, the cross rod member extending transversely of the forward region of the seat cushion to thereby prevent forward slippage of the passenger's buttocks portion on the seat cushion. Namely, in the case of sudden collision, the passenger's buttocks portion, which is being slipped and sunk into the seat cushion, is quickly contacted with the cross rod member and thus prevented against further forward movement, thereby protecting the lower body portion of passenger.

Incidentally, among the vehicle seats, there has been known a vehicle seat having a seat lifter provided therein, as disclosed for example from the Japanese Laid-Open Patent Publication No. 2001-88589. According thereto, the seat lifter has a pair of links pivotally connected with the respective right and left lateral sides of the seat cushion, and operation of the seat lifter causes vertical movement of the forward end portion of seat cushion.

It may be possible to connect the aforementioned cross rod member taught in the Pub. No. 2002-46513 between the pair of links of the seat lifter associated with the Pub. No. 2001-88589 in order to prevent the above-stated forward buttocks slippage problem. However, in that case, when a sudden collision occurs and the passenger's buttocks portion is about to slip on the seat cushion as discussed above, it is more likely than not that a large load applied from the passenger's buttocks portion to the cross rod member will deform both of the two links of the seat lifter. Namely, both two links will be twisted in either the right or left directions or bent in a direction laterally of the seat cushion. Of course, to solve such problem, one can contemplate increasing the thickness of the links to resist such large load. But, it will require reinforcing the pivot points and peripheral elements associated with the links, which will result in an undesired complicated structure and increase of its size.

SUMMARY OF THE INVENTION

In view of the above-stated drawbacks, it is a purpose of the present invention to provide an improved structure of seat with seat lifter which is quite simplified to avoid its complicated structure, while effectively preventing deformation of lifter links of the seat lifter.

In order to achieve such purpose, in accordance with the present invention, there is basically provided a structure of a seat with a seat lifter in combination with a floor of vehicle, comprising:

an upwardly extending support means fixedly provided on a floor of vehicle;

a pair of lifter links of the seat lifter provided in at least forward portion of seat cushion, each of said pair of lifter links being at one end thereof pivotally connected with the upwardly extending support means at a pivot point so that another end thereof is movable about the pivot point, wherein that another end of each of the pair of lifter links is connected with the seat cushion;

a horizontal bar element which is fixedly extended between the pair of lifter links, the horizontal bar element being disposed at a point in a forward buttocks slippage locus along which a buttocks portion of a passenger is to be slipped forwardly on the seat cushion in an emergency case such as a collision; and a reinforcing means defined between the pair of lifter links and the upwardly extending support means so as to reinforce the lifter links while allowing for movement of the lifter links with respect to the upwardly extending support means.

Preferably, the upwardly extending support means may include a wall portion facing to a lower portion of the reinforcing means, and the reinforcing means may include a stopper means defined at the lower portion thereof, the stopper means being normally located adjacent to and out of contact with the wall portion of the upwardly extending support means, with such an arrangement that, when the pair of lifter links and the reinforcing means are about to be bent by a great load applied thereto from the passenger in the emergency case, the stopper means is immediately brought to contact with the wall portion, thereby preventing both lifter links and reinforcing means against bending.

In one aspect of the present invention, each of the pair of lifter links has a midway portion between said one and another ends thereof, and the reinforcing means may comprise a pair of reinforcing brackets, each having one end portion and another end portion and further extending adjacently alongside of the respective two lifter links. The two lifter links may each be pivotally connected at the midway portion thereof with that one end portion of each of the two reinforcing brackets by a connecting means, such that the afore-said other end portion of each of the two lifter links is movable about the pivot point. Further, the foregoing another end portion of each of the two reinforcing brackets may be fixed to the upwardly extending support means.

In another aspect of the present invention, the reinforcing means may comprise a lower extension area formed in each of the foregoing pair of lifter links, and such lower extension area may be movably connected by a connecting means with the upwardly extending support means, so that the foregoing another end portion of each of the two lifter links is movable about the afore-said pivot point.

Other various features and advantages of the present invention will become apparent from reading of the description hereinafter, with respect to the annexed drawings.

DETAILED DESCRIPTION OF PREFERRED EMBODIMENTS OF THE INVENTION

Referring to FIGS. 1 to 4, there are illustrated preferred exemplary embodiments of vehicle seat structure with a seat lifter, as generally designated by (10) in accordance with the present invention. Namely, first and second exemplary embodiments are respectively shown in one set of FIGS. 1 and 2 and another set of FIGS. 3 to 4, but it should be understood that those two modes are suggested by way of example within the gist and scopes of the present invention and therefore basically common to each other for the purposes of the invention, as will become appreciable hereinafter.

Figure 1:
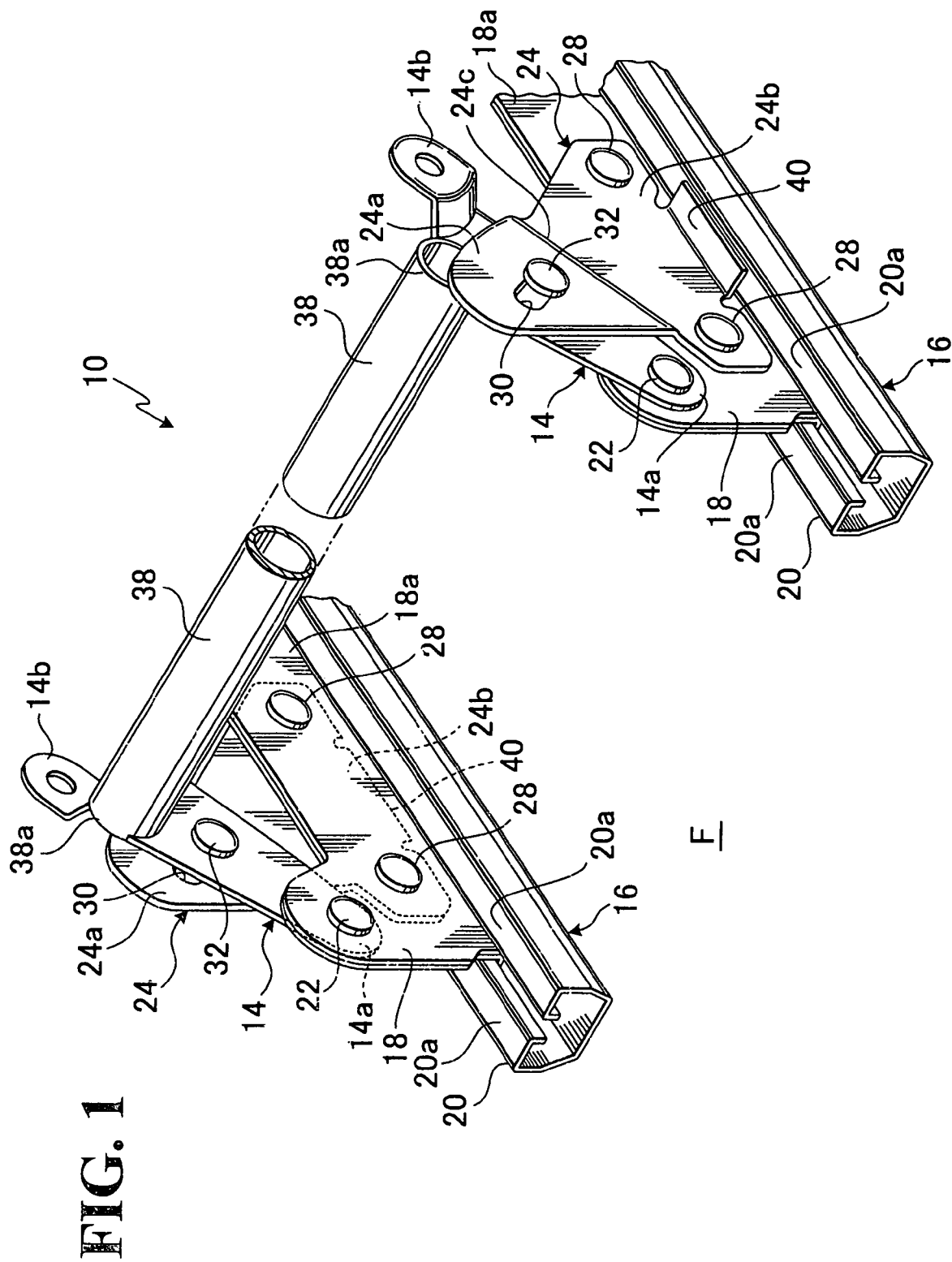
FIG. 1 is a partly broken perspective view showing a first embodiment of a seat structure with a seat lifter in accordance with the present invention.
Figure 2:
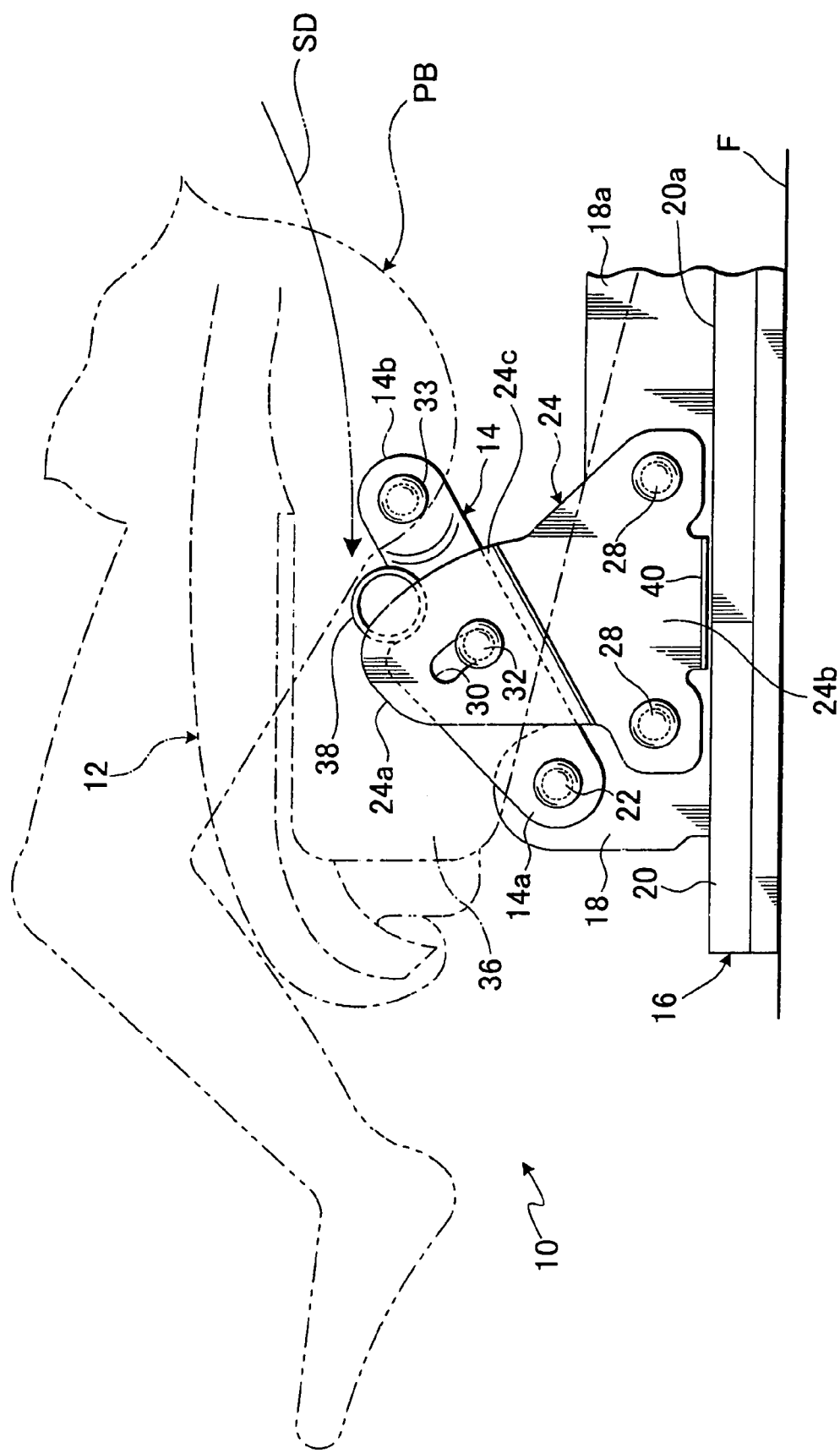
FIG. 2 is a partly broken side view of a principal part of the first embodiment.

Reference is first made to FIGS. 1 and 2 which show the first embodiment of the vehicle seat structure (10) provided with a seat lifter for causing vertical movement of vehicle seat as known in the art. As far as all the figures are concerned, a whole of the seat lifter is not shown, but a pair of lifter links (14) are only shown in association with the seat lifter, for the sake of simplicity of description, and, for the same reason, only a seat cushion (12) is shown as a part forming a vehicle seat including the seat structure (10). Thus, although all elements forming the vehicle seat are not shown, any person skilled in the art will appreciate the gist and structural features of the present invention in light of whole vehicle seat construction provided with seat lifter, considering the description hereinafter and the drawings.

As with ordinary seat lifters, such as a seat lifter disclosed from the Japanese Laid-Open Patent Pub. No. 2001-88589, at least a pair of lifter links (14) are disposed at a forward portion of a seat cushion (12). In this connection, as far as the present embodiment is concerned, a pair of spaced-apart slide rails (16) are provided under the seat cushion (12), and it is to be observed that the two lifter links (14) are movably connected between the seat cushion (12) and the two slide rails (16).

The pair of slide rails (16) are known in the art, and each of them comprises a lower rail (20) adapted for fixation to a floor (F) of vehicle and an upper rail (18) slidably fitted in the lower rail (20). As shown, the upper rail (18) has an upward extension (18a).

According to the present first embodiment, each lifter link (14) has a lower end portion (14a) which is pivotally connected by a pivot pin (22) with the corresponding upward extension (18a) of each upper rail (18). On the other hand, as can be seen from FIG. 2, an upper end portion (14b) of the lifter link (14) is pivotally connected by a pin (33) with a side frame member (36) provided in the seat cushion (12).

Designation (38) represents a horizontal bar element which is embodied herein as a forward buttocks slippage preventive means for preventing a buttocks portion (PB) of passenger from slipping on the seat cushion (12) while being sunk thereinto, under the influence of an inertia, in such an emergency case as a collision. As shown in FIG. 1, the horizontal bar element (38) is fixedly extended between the two upper end portions (14b) respectively of the two lifter links (14). In this respect, as understandable by the two-dot chain lines in FIG. 2, the horizontal bar member (38) is disposed at a given point in a forward buttocks slippage locus along which the buttocks portion (PB) of the passenger is to be slipped forwardly on the seat cushion (12) as indicated by the two-dot chain arrow (SD), thereby to receive the passenger's buttocks portion (PB) and prevent it from further forward movement in the case of collision or other emergency case.

The horizontal bar element (38) may be formed from a tubular metallic material as illustrated. Each of two ends (38a) of the horizontal bar member (38) is firmly connected as by welding with the two upper end portions respective of the two lifter links (14) and situated within the seat cushion (12). Thus, both lifter links (14) and horizontal bar member (38) are rotatable vertically about their respective pivot pins (22), but, it is noted that the vertical rotation range of those links (14) and horizontal bar member (38) should be limited to a range of the afore-said forward slippage locus so as to insure preventing the forward buttocks slippage stated above.

In accordance with the present invention, there is provided a reinforcing element between the lifter link (14) and the slide rail (16) to protect the lifter link (14) against bending and twisting in the above-discussed emergency cases. As shown in FIG. 1, the reinforcing element may be a pair of reinforcing brackets (24), each comprising an upper planar connecting portion (24a) and a lower planar securing portion (24b). Specifically, the upper planar connecting portion (24a) extends outwardly from the lower planar securing portion (24b) in an offset relation therewith so as to define a slant boundary (24c) therebetween which slopes upwardly from the lower planar securing portion (24b) to the upper planar connecting portion (24a). Formed in the upper planar connecting portion (24a) is an arcuate hole (30) which extends along a circle having a center at the pivot pin (22).

As viewed and understandable from FIG. 1, the left-side reinforcing bracket (24) is attached at the lower planar securing portion (24b) to the planar outer side of the upward extension (18a) of the corresponding left-side slide rail (18) and firmly connected thereto by means of two securing bolts (28), while the upper coplanar connecting portion (24a) of that left-side reinforcing bracket (24) is disposed adjacent to the planar outer side of the left-side lifter link (14). Then, the midway portion of the left-side lifter link (24) is movably connected with the arcuate hole (30) formed in the upper planar connecting portion (24a) by inserting a connecting slide pin (32) through the arcuate hole (30) and fixing the same to that particular midway portion of lifter link (24).

Likewise, briefly stated, the right-side reinforcing bracket (24) is firmly coupled at the lower planar securing portion (24b) thereof with the planar outer side of the upward extension (18a) of the corresponding right-side slide rail (18) by two securing bolts (28), and the midway portion of the right-side lifter link (24) is movably connected with the arcuate hole (30) of the right-side reinforcing bracket (24) by inserting a connecting slide pin (32) through the arcuate hole (30) and fixing the same to that particular midway portion of lifter link (24).

As sated above, the arcuate hole (30) is formed along a circle having a center at the pivot pin (22), thus allowing the connecting slide pin (32) to be slidingly moved along the arcuate hole (30) about the pivot pin (22), which in turn allows both two lifter links (14) to be rotated vertically about that pivot pin (22) while being supported by the two reinforcing brackets (24) In this respect, it is to be appreciated that upper and lower opposite edges of the arcuate hole (30), each of which limits movement of the connecting slide pin (32), naturally serve to limit the upward and downward rotation of the lifter links (14), thereby preventing excessive rotation of the lifter links (14), so that the horizontal bar member (38) works within a range of the aforementioned forward buttocks slippage locus to insure preventing the forward slippage of passenger's buttocks portion on the seat cushion (12).

Therefore, according to the seat structure (10) of the present invention, each lifter link (14) has one pivotal connection at (22) and another pivotal connection at (32), thus having two spaced-apart connection points with respect to the slide rail (16). This insures to prevent bending or twisting of lifter links (14) which is caused by a great load applied to the lifter links (14) when the passenger's buttocks portion (PB) is slipped forwardly and brought to contact with the horizontal bar member (38), giving the great load to the lifter links (14).

Further, in the present invention, only two reinforcing brackets (24) are provided to sufficiently reinforce the respective two lifter links (14), and therefore, there is no need to reinforce the lifter links (14) themselves. Neither, no need to provide any reinforcing element to the pivotal connection points (at 22) and peripheral members (at 16 and 38). Hence, it is possible to avoid any complicated and large-sized structure for preventing deformation of the lifter links (14).

The firm connection of horizontal bar element (38) between the two lifter links (14) eliminates necessity to provide any conventional securing rod which has normally been connected between the two lifter links. Moreover, the horizontal bar member (38) serves as a cross frame in the seat cushion (12) in addition to its main function for preventing the forward buttocks slippage, thereby avoiding a plural number of cross frames for the seat cushion (12). Thus, it is possible to reduce the number of parts in the seat cushion (12) and also to attain an increased space under the seat cushion (12).

In accordance with the present invention, it is preferable to form a stopper piece (40) integrally in the lower edge of the reinforcing bracket (24), the stopper piece (40) extending outwardly and horizontally from the vertical wall of the reinforcing bracket (24) so as to be normally out of contact with the upper surface (20a) of the lower rail (20). The advantage of such stopper piece (40) is that, when the above-stated forward buttocks slippage occurs, tending to bend the lifter links (14) in either of rightward and leftward directions, the stopper piece (40) is immediately brought to contact with the lower rail upper surface (20a) of one of the two slide rails (16), thereby insuring to prevent lateral bending of the lifter links (14). Hence, the provision of stopper piece (40) effectively adds to reinforcement of both lifter links (14) and reinforcing bracket (24).

The present embodiment has been described in combination with the slide rails (16) each having the upward extension (18a) with which the lifter links (14) and reinforcing bracket (24) are connected. But, this is not limitative. Alternatively, in place of the slide rails (16), any other upwardly extending support means equivalent to such upward extension (18a) may be fixedly provided on the vehicle floor (F). For example, a pair of spaced-apart vertically extending support brackets may be fixed on the vehicle floor (F). In that case, the two lifter links (14) may be pivotally connected with such pair of spaced-apart vertically extending support brackets, respectively, and the reinforcing brackets (24) may respectively be fixedly connected with those particular two support brackets, such that each of them is slidably connected with the midway portion of each lifter link (14) via the arcuate hole (30) as described previously.

Figure 3:
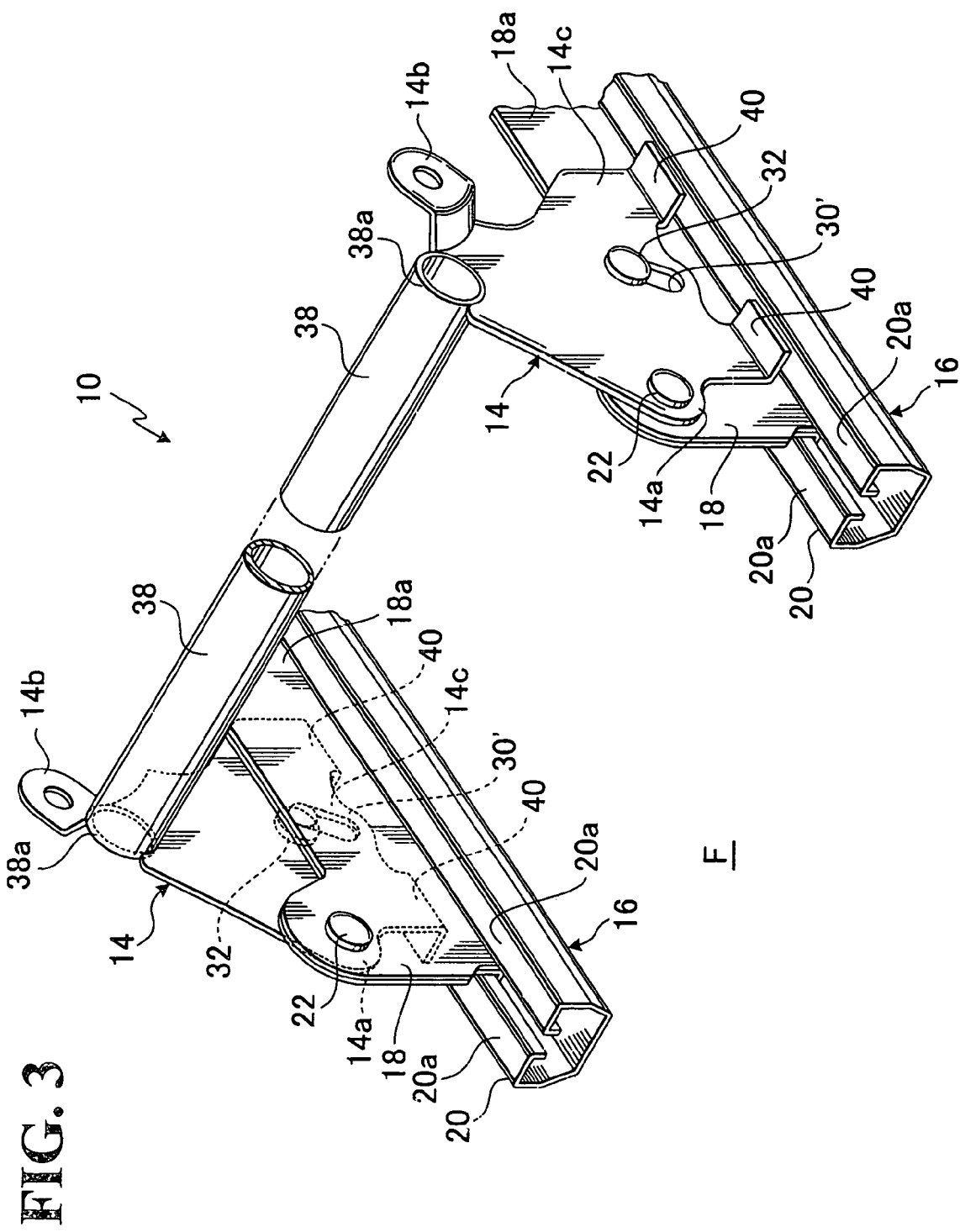
FIG. 3 is a partly broken perspective view showing a second alternative embodiment of the seat structure with seat lifter.
Figure 4:
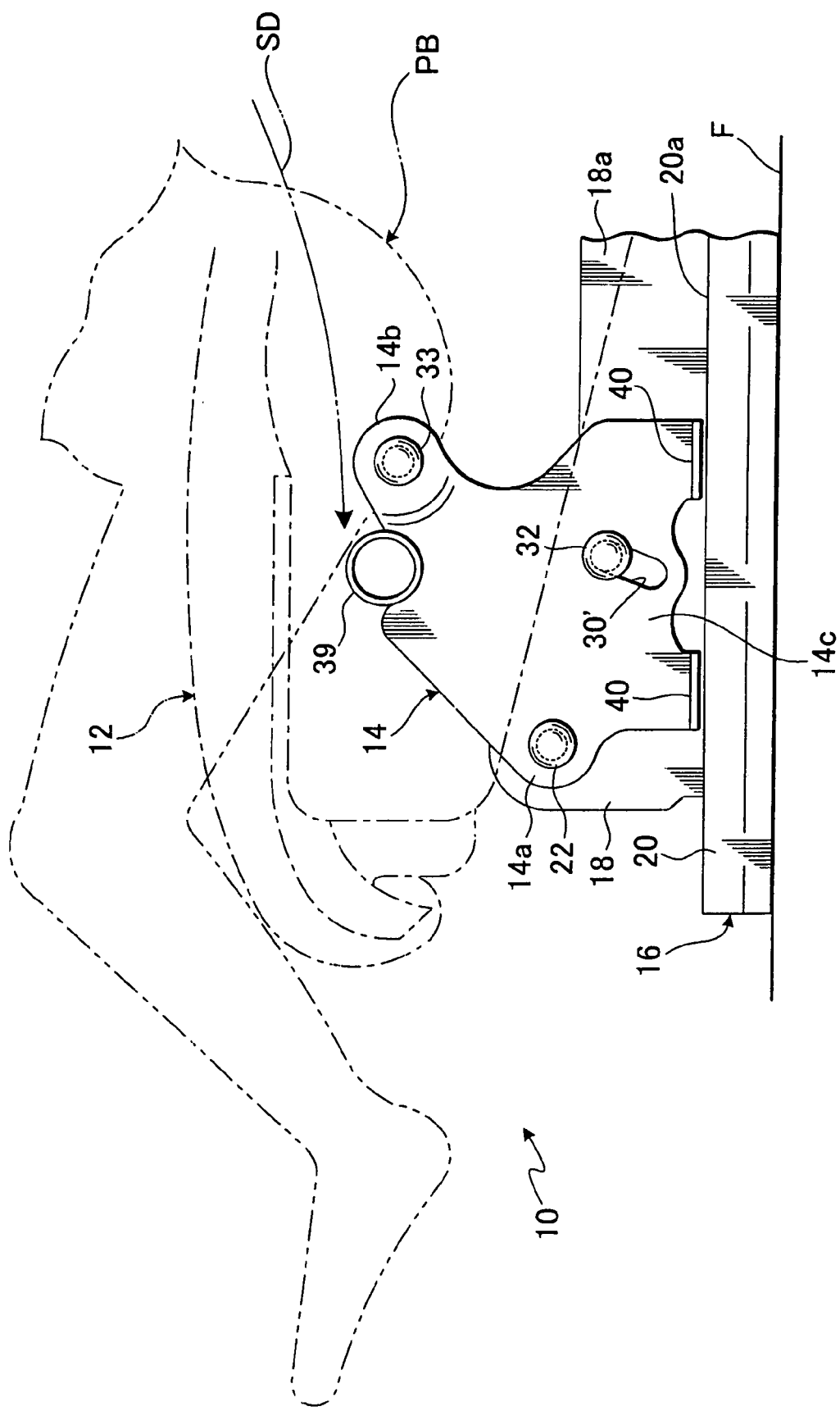
FIG. 4 is a partly broken side view of a principal part of the second embodiment.

Reference is made to FIGS. 3 and 4 which show a second alternative embodiment of the seat structure in the present invention. In this embodiment, there are employed the horizontal bar element (38), seat cushion (12) and two spaced-apart slide rails (16) which are all identical to those described in the foregoing first embodiment. The present second embodiment only differs from the first embodiment in terms of only providing a pair of lifter links (14) (14), each having an integral lower securing extension area (14c) coplanar therewith. Thus, all like designations to be used hereinafter correspond to all like designations that have been given in the foregoing first embodiment, and no further description will be made of common elements and parts between the first and second embodiments.

As shown, each lifter link (14) is so formed from a rigid plate material as to have a forward pivotal end portion (14a), an upper connecting end portion (14b), and a lower securing extension area (14c), all of which are integral and coplanar with one another. The forward pivotal end portion (14a) is rotatably connected by a pivot pin (22) with the corresponding upward extension (18a) of each upper rail (18). On the other hand, as can be seen from FIG. 4, the upper connecting end portion (14b) is pivotally connected by a pin (33) with a lateral frame member (36) provided in the seat cushion (12). Formed substantially in a central area of the lower securing extension area (14c) is an arcuate hole (30') which extends along a circle having a center at the pivot pin (22).

The horizontal bar element (38) (i.e. the forward buttocks slippage preventive element) is fixedly at both end portions (38a) (38a) thereof connected with the two upper connecting end portions (14b) respectively of the two lifter links (14).

As viewed and understandable from FIG. 3, the left-side lifter link (14) is attached at the lower securing extension area (14c) thereof to the planar outer side of the upward extension (18a) of the corresponding left-side slide rail (18) and rotatably connected thereto by means of a connecting slide pin (32) which is slidably inserted through the arcuate hole (30') and fixed to the upward extension (18a) associated with the left-side slide rail (18). Likewise, the right-side lifter link (14) is attached at the lower securing extension area (14c) thereof to the planar outer side of the upward extension (18a) of the corresponding left-side slide rail (18) and rotatably connected thereto by means of a connecting slide pin (32) which is slidably inserted through the arcuate hole (30') and fixed to the upward extension (18a) associated with the right-side slide rail (18).

Accordingly, the connecting slide pin (32) is allowed to be slidingly moved along the arcuate hole (30') about the pivot pin (22), which in turn allows both two lifter links (14) to be rotated vertically about that pivot pin (22), while being supported by the two upper rail upward extension (18a), respectively. In this regard, it is to be appreciated that upper and lower opposite edges of the arcuate hole (30'), each of which limits movement of the connecting slide pin (32), naturally serve to limit the downward and upward rotation of the lifter links (14), thereby preventing excessive rotation of the lifter links (14), so that the horizontal bar element (38) works within a range of the aforementioned forward buttocks slippage locus to insure preventing the forward slippage of passenger's buttocks portion (PB) on the seat cushion (12).

Therefore, likewise as in the first embodiment, each lifter link (14) has one pivotal connection at (22) and another pivotal connection at (32), thus having two spaced-apart connection points with respect to the slide rail (16). This insures to prevent bending or twisting of lifter links (14) which is caused by a great load applied to the lifter links (14) when the passenger's buttocks portion (PB) is slipped forwardly and brought to contact with the horizontal bar element (38), giving the great load to the lifter links (14). Further, the integral formation of lower securing extension area (14c) suffices to reinforce each lifter link (14) and therefore, there is no need to use any other separate reinforcing element to both two lifter links (14). Neither, no need to provide any reinforcing means to the pivotal connection points (at 22) and peripheral members (at 16 and 38). Hence, in this second embodiment also, it is possible to avoid any complicated and large-sized structure for preventing deformation of the lifter links (14).

In the present second embodiment, it is preferable to form a pair of spaced-apart stopper pieces (40) (40) integrally in the lower edge of each lifter link (14), wherein the two stopper pieces (40) extend outwardly and horizontally from the vertical wall of the lifter link (14) so as to be normally out of contact with the upper surface (20a) of the lower rail (20). Hence, when the above-stated forward buttocks slippage occurs, tending to bend the lifter links (14) in either of rightward and leftward directions, the two stopper pieces (40) are immediately brought to contact with the lower rail upper surface (20a) of one of the two slide rails (16), thereby insuring to prevent lateral bending of the lifter links (14).

As likewise in the first embodiment, in place of the slide rails (16), any other upwardly extending support means equivalent to the upper rail upward extension (18a) may be fixedly provided on the vehicle floor (F). For example, a pair of spaced-apart vertically extending support brackets may be fixed on the vehicle floor (F). In that case, the two lifter links (14) may be pivotally connected with such pair of spaced-apart vertically extending support brackets, respectively, such that each of the two lifter links (14) is slidably connected with each of the two vertically extending support brackets via the arcuate hole (30').

While having described the present invention so far, it should be understood that the present invention is not limited to the illustrated embodiment, but any other modification, replacement and addition may be applied thereto without departing from the scopes of the appended claims.

What is claimed is:

1. A structure of a seat with a seat lifter in combination with a floor of a vehicle, in which the seat includes a seat cushion on which a passenger is to sit on, comprising:

an upwardly extending support means fixedly provided on said floor of the vehicle;

a pair of lifter links of said seat lifter provided in at least a forward portion of said seat cushion, each of said pair of lifter links being at one end thereof pivotally connected with said upwardly extending support means at a pivot point so that another end thereof is movable about said pivot point, wherein said another end of said each of said pair of lifter links is connected with said seat cushion;

a horizontal bar element which is fixedly extended between said pair of lifter links, said horizontal bar element being disposed at a point in a forward buttocks slippage locus along which a buttocks portion of said passenger is to be slipped forwardly on said seat cushion in an emergency case such as a collision; and a reinforcing means defined between said pair of lifter links and said upwardly extending support means so as to reinforce said pair of lifter links while allowing for movement of said pair of lifter links with respect to said upwardly extending support means.

2. The structure of a seat with a seat lifter as claimed in claim 1, wherein said upwardly extending support means includes a will portion facing a lower portion of said reinforcing means, and wherein said reinforcing means includes a stopper means defined at the lower portion thereof, said stopper means being normally located adjacent to and out of contact with said wall portion of said upwardly extending support means, with such an arrangement that, when said pair of lifter links and said reinforcing means are about to be bent by a load applied thereto from said passenger in said emergency case, said stopper means is immediately brought to contact with said wall portion, thereby protecting both said pair of lifter links and said reinforcing means against bending.

3. The structure of a seat with a seat lifter as claimed in claim 1, which further includes a stopper means, and a pair of slide rails, each comprising a lower rail fixed to said floor of vehicle and an upper rail slidably fitted in said lower rail, wherein said lower rail has an upper wall portion and said upper rail having an upward extension area, wherein said upwardly extending support means comprises said upward extension area of said lower rail, and wherein, when said pair of lifter links and said reinforcing means are about to be bent by a load applied thereto from said passenger in said emergency case, said stopper means is immediately brought to contact with said upper wall portion of said lower rail, thereby protecting both said pair of lifter links and said reinforcing means against bending.

4. The structure of a seat with a seat lifter as claimed in claim 1, wherein each of said pair of lifter links has a midway portion between said one and another ends thereof, wherein said reinforcing means comprises a pair of reinforcing brackets, each having one end portion and another end portion and further extending adjacently alongside of the respective said pair of lifter links, wherein said pair of lifter links are each pivotally connected at said midway portion thereof with said one end portion of said each of said pair of reinforcing brackets by a connecting means, such that said another end portion of each of said pair of lifter links is movable about said pivot point, and wherein said another end portion of said each of said pair of reinforcing brackets is fixed to said upwardly extending support means fixedly provided on said floor of the vehicle.

5. The structure of a seat with a seat lifter according to claim 4, wherein said upwardly extending support means includes a wall portion facing toward a lower end of each of said pair of reinforcing brackets, and wherein a stopper means is defined in said lower end of said each of said pair of reinforcing brackets, said stopper means being normally located adjacent to and out of contact with said wall portion of said upwardly extending support means fixedly provided on said floor of vehicle, with such an arrangement that, when said pair of lifter links and said pair of reinforcing brackets are about to be bent by a load applied thereto from said passenger in said emergency case, said stopper means is immediately brought to contact with said wall portion of said upwardly extending support means, thereby protecting both said pair of lifter links and said pair of reinforcing brackets against bending.

6. The structure of a seat with a seat lifter according to claim 5, wherein said stopper means comprises at least one stopper piece integrally formed in said lower end of said each of said pair of reinforcing brackets, said at least one stopper piece extending outwardly and horizontally from said each of said pair of lifter links at a point above said wall portion of said upwardly extending support means.

7. The structure of a seat with a seat lifter according to claim 4, wherein said connecting means comprises: an arcuate hole formed in said each of said pair of reinforcing brackets, said arcuate hole extending along a circle having a center at said pivot point; and a connecting pin which is slidably inserted through said arcuate hole and fixed to said midway portion of said each of said pair of lifter links.

8. The structure of a seat with a seat lifter as claimed in claim 5, which further includes a pair of slide rails comprising a lower rail fixed to said floor of vehicle and an upper rail slidably fitted in said lower rail, wherein said lower rail has an upper wall portion and said upper rail having an upward extension area, wherein said upwardly extending support means comprises said upward extension area of said lower rail, wherein said upper wall portion of said lower rail corresponds to said wall portion of said upwardly extending support means, wherein said another end portion of each of said pair of reinforcing brackets is fixed to said upward extension area of said lower rail, and wherein, when said pair of lifter links and said pair of reinforcing brackets are about to be bent by a load applied thereto from said passenger in said emergency case, said stopper means is immediately brought to contact with said upper wall portion of said lower rail, thereby protecting both said pair of lifter links and said pair of reinforcing brackets against bending.

9. The structure of a seat with a seat lifter as claimed in claim 1, wherein said reinforcing means comprises a lower extension area formed in said each of said pair of lifter links, and wherein said lower extension area is movably connected by a connecting means with said upwardly extending support means, so that said another end portion of each of said pair of lifter links is movable about said pivot point.

10. The structure of a seat with a seat lifter according to claim 1, wherein said reinforcing means comprises a lower extension area formed in said each of said pair of lifter links, wherein said lower extension area is movably connected by a connecting means with said upwardly extending support means fixedly provided on said floor of vehicle, so that said another end portion of each of said pair of lifter links is movable about said pivot point, wherein said upwardly extending support means includes a wall portion facing toward a lower end of each of said pair of lifter links, and wherein a stopper means is defined in said lower end of said lower extension area of each of said pair of lifter links, said stopper means being normally located adjacent to and out of contact with said wall portion of said upwardly extending support means, with such an arrangement that, when said pair of lifter links are about to be bent by a load applied thereto from said passenger in said emergency case, said stopper means is immediately brought to contact with said wall portion of said upwardly extending support means, thereby protecting said pair of lifter links as well as said lower extension area against bending.

11. The structure of a seat with a seat lifter according to claim 10, wherein said stopper means comprises at least one stopper piece integrally formed in said lower end of laid lower extension area of each of said pair of lifter links, said at least one stopper piece extending outwardly and horizontally from said each of said pair of lifter links at a point above said wall portion of said upwardly extending support means.

12. The structure of a seat with a seat lifter according to claim 9, which further includes a pair of slide rails, each comprising a lower rail fixed to said floor of the vehicle and an upper rail slidably fitted in said lower rail, wherein said lower rail has an upper wall portion and said upper rail having an upward extension area, wherein said upwardly extending support means comprises said upward extension area of said lower rail, wherein said upper wall portion of said lower rail corresponds to said wall portion of said upwardly extending support means, and wherein, when said pair of lifter links are about to be bent by a load applied thereto from said passenger in said emergency case, said stopper means is immediately brought to contact with said upper wail portion of said lower rail, thereby protecting both said pair of lifter links as well as said lower extension area against bending.

13. The structure of a seat with a seat lifter according to claim 12, wherein said stopper means comprises at least one stopper piece integrally formed in said lower end of said lower extension area of each of said pair of lifter links, said at least one stopper piece extending outwardly and horizontally from said each of said pair of lifter links at a point above said upper wall portion of said lower rail.

14. The structure of a seat with a seat lifter according to claim 10, wherein said connecting means comprises: an arcuate hole formed in said lower extension are of said each of said pair of lifter links, said arcuate hole extending along a circle having a center at said pivot point; and a connecting pin which is slidably inserted through said arcuate hole and fixed to said upwardly extending support means.

15. A structure of a seat with a seat lifter in combination with a floor of a vehicle, in which the seat includes a seat cushion on which a passenger is to sit on, comprising:
- an upwardly extending support means fixedly provided on said floor of vehicle;
- a pair of lifter links of said seat lifter provided in at least a forward portion of said seat cushion, each of said pair of lifter links being at one end thereof pivotally connected with said upwardly extending support means at a pivot point so that another end thereof is movable about said pivot point, wherein said another end of said each of said pair of lifter links is connected with said seat cushion;
- a horizontal bar element which is fixedly extended between said pair of lifter links, said horizontal bar element being disposed at a point in a forward buttocks slippage locus along which a buttocks portion of said passenger is to be slipped forwardly on said seat cushion in an emergency case such as a collision; and
- a reinforcing means defined between said pair of lifter links and said upwardly extending support means so as to reinforce said pair of lifter links, said reinforcing means including a connecting means by which said pair of lifter links are movably connected with the reinforcing means, thereby allowing for movement of said pair of lifter links with respect to said upwardly extending support means.

* * * * *